(12) United States Patent
Ban

(10) Patent No.: US 8,750,659 B2
(45) Date of Patent: Jun. 10, 2014

(54) OPTICAL MODULE

(75) Inventor: Takuma Ban, Fujisawa (JP)

(73) Assignee: Oclaro Japan, Inc., Kanagawa (JP)

( * ) Notice: Subject to any disclaimer, the term of this patent is extended or adjusted under 35 U.S.C. 154(b) by 94 days.

(21) Appl. No.: 13/302,226

(22) Filed: Nov. 22, 2011

(65) Prior Publication Data

US 2012/0128300 A1    May 24, 2012

(30) Foreign Application Priority Data

Nov. 24, 2010  (JP) ................. 2010-261219

(51) Int. Cl.
  *G02B 6/32*  (2006.01)
  *G02B 6/42*  (2006.01)
  *G02B 6/12*  (2006.01)

(52) U.S. Cl.
  USPC ................. 385/33; 385/14; 385/93

(58) Field of Classification Search
  USPC ......................................... 385/33
  See application file for complete search history.

(56) References Cited

U.S. PATENT DOCUMENTS

| | | | | |
|---|---|---|---|---|
| 4,433,898 A | * | 2/1984 | Nasiri ............... | 385/91 |
| 5,002,357 A | * | 3/1991 | Newell .............. | 385/33 |
| 7,441,965 B2 | * | 10/2008 | Furuno et al. ...... | 385/93 |
| 7,559,705 B2 | * | 7/2009 | Vanniasinkam et al. | 385/93 |
| 2009/0303490 A1 | | 12/2009 | Asano et al. | |
| 2010/0067854 A1 | * | 3/2010 | Oki ................... | 385/92 |

FOREIGN PATENT DOCUMENTS

| | | |
|---|---|---|
| JP | 2005-309370 A | 11/2005 |
| JP | 2006-293110 | 10/2006 |
| JP | 2008-090232 | 4/2008 |
| JP | 2009-302682 | 12/2009 |

OTHER PUBLICATIONS

Japanese Office Action received in Japanese Application No. 2010-261219 dated Feb. 25, 2014.

* cited by examiner

*Primary Examiner* — Omar Rojas
(74) *Attorney, Agent, or Firm* — Mattingly & Malur, PC

(57) ABSTRACT

Provided is an optical module, including: an optical system having an optical path in a space thereof; an electro-optical device optically connected to a first input/output port as one of an input port and an output port of the optical system; an optical waveguide having flexibility; and a housing including an optical interface. The optical waveguide includes: a first connection portion optically connected to the optical interface in the housing; and a second connection portion optically connected to a second input/output port as another one of the input port and the output port of the optical system. The optical waveguide is arranged so as to be bent in the housing. A first optical axis passing between the optical interface and the first connection portion is displaced from a second optical axis passing between the second input/output port and the second connection portion.

15 Claims, 9 Drawing Sheets

OPTICAL MODULE

CROSS-REFERENCE TO RELATED APPLICATION

The present application claims priority from Japanese application JP 2010-261219 filed on Nov. 24, 2010, the content of which is hereby incorporated by reference into this application.

BACKGROUND OF THE INVENTION

1. Field of the Invention

The present invention relates to an optical module, and more particularly, to an optical module for differential quadrature phase shift keying (DQPSK), differential phase shift keying (DPSK), quadrature phase shift keying (QPSK), dual polarization quadrature phase shift keying (DP-QPSK), and the like.

2. Description of the Related Art

An optical communication network is constructed of optical fibers each serving as a medium for propagating an optical signal, and optical transceivers for transmitting and receiving the optical signal. The optical transceiver incorporates, in a housing thereof, an optical module for converting an electric signal into an optical signal and converting an optical signal into an electric signal, and a printed circuit board having control electronic devices, electric connectors, and the like mounted thereon.

A general optical module includes optical devices for performing opto-electric conversion, such as a laser (light emitting device) and a photodiode (light receiving device), which are mounted in a package thereof. The package is made of metal, ceramics, or the like in many cases. The package that is frequently used has a box-like shape, which provides an advantage that a mounting process is simple. Under a state in which a lid of the box-like package is not fixed, a substrate, an IC, optical components such as lenses, a light emitting device, a light receiving device, and the like can be arranged in plane inside the package. After the components are mounted inside, the lid is fixed to construct the package.

Heretofore, in the general optical module, the light emitting device converts a modulated electric signal into a light intensity-modulated signal to propagate an optical signal, and further, the light receiving device performs opto-electric conversion on the light intensity change to obtain an electric intensity change. In this manner, the signal is transmitted.

In recent years, however, along with an increase in transmission capacity of the optical module, so-called phase shift keying (PSK) has emerged as a method of propagating signals obtained by modulating a phase of light. This method is known as, for example, differential quadrature phase shift keying (DQPSK), differential phase shift keying (DPSK), quadrature phase shift keying (QPSK), dual polarization quadrature phase shift keying (DP-QPSK), and polarization multiplexed quadrature phase shift keying (PM-QPSK). In recent years, an optical transmission module, an optical reception module, a transceiver, and the like which are compatible with each method have been reported in an academic meeting and the like. In such an optical module using the phase modulation method, it is necessary to house a plurality of optical devices in the housing of the optical module, and mount optical components for multiplexing and demultiplexing optical signals. In particular, in the optical reception module, it is necessary to construct an interference optical system in the housing of the module so that phase-modulated optical signals are caused to interfere with each other to be converted into light intensity signals. Further, it is necessary to convert the optical signals into electric signals by the light receiving device.

By the way, at the same time, the optical transceiver has been required to be reduced in size and height in recent years, and therefore studies have been conducted to reduce the size and height of the optical transmission module and the optical reception module. As a method therefor, the recent optical module has included the optical devices and the optical components for multiplexing and demultiplexing optical signals, which are all mounted in a single housing.

Japanese Patent Application Laid-open No. 2005-309370 discloses an example of such an optical module. The optical module disclosed in Japanese Patent Application Laid-open No. 2005-309370 is an optical module using the intensity modulation method. The conventional optical module includes a plurality of light emitting devices (laser diodes) and a plurality of light receiving devices (photodiodes), which are fixed to a housing thereof. A total reflection wavelength filter and a wavelength separation filter are spatially arranged inside the housing so that the optical signals are reflected and allowed to pass through the filter, to thereby multiplex and demultiplex the optical signals. In the conventional example, the use of one optical fiber allows transmission of one transmission optical signal and two reception optical signals.

Further, according to the conventional example, an optical signal emitted from the light emitting device is condensed by the lens, and the optical signal is propagated to a capillary having a fiber integrated therein. Then, the optical signal exiting from the capillary is collimated by a collimator lens, and the collimated light is propagated in a space inside the housing. By mounting the capillary having a fiber integrated therein, it is possible to correct an optical axis by the fiber integrated in the capillary even if the light from the light emitting device is tilted relative to the optical axis.

In the conventional example, it is necessary to arrange in line the components within a range of from the light emitting device (laser diode) to the fiber collimator. Specifically, it is necessary to position in line the optical axes of the light emitting device, the condenser lens, the capillary, the collimator lens, the filters, and the fiber collimator. However, the above-mentioned components differ in shape and size, and in particular, the fiber collimator is mounted on a wall of the housing whereas the collimator lens and the capillary are mounted on a bottom surface of the housing. As a result, the conventional optical transmission module in which the optical axes of all the components are to be aligned in line has a disadvantage that the thickness of the housing cannot be reduced.

Similarly, in the conventional example, it is necessary to arrange in line the components within a range of from the light emitting device (laser diode) to a member having a reflecting function (total reflection wavelength filter). Specifically, it is necessary to position in line the light emitting device, the condenser lens, the capillary, the collimator, and the total reflection wavelength filter. Meanwhile, the positions and orientations of the fiber collimator and the wavelength separation filter are determined in advance, and hence there is almost no degree of freedom in designing. Further, the fiber collimator is fixed at a position that is regulated by the optical transceiver, and hence there is a disadvantage that when a spatial optical system of the conventional example is actually assembled, the size thereof increases. The size of the spatial optical system is proportional to the size of the housing. Therefore, the conventional optical module has a disadvantage that the housing is large.

SUMMARY OF THE INVENTION

The present invention has an object to provide an optical module which can successfully be downsized without preventing highly accurate alignment of members and lowering efficiency of interference due to a change in ambient temperature or the like.

(1) The present invention provides an optical module, including: an optical system having an optical path in a space thereof; an electro-optical device optically connected to a first input/output port as one of an input port and an output port of the optical system; an optical waveguide having flexibility; and a housing including an optical interface for optical connection to an outside, for housing the optical system, the electro-optical device, and the optical waveguide, in which the optical waveguide includes: a first connection portion optically connected to the optical interface in the housing; and a second connection portion optically connected to a second input/output port as another one of the input port and the output port of the optical system, in which the optical waveguide is arranged so as to be bent in the housing, and in which a first optical axis passing between the optical interface and the first connection portion is displaced from a second optical axis passing between the second input/output port and the second connection portion. According to the present invention, the optical waveguide has flexibility, and hence the optical waveguide can be freely bent to correspond to the arrangement of the optical system. Thus, the degree of freedom in designing the optical system increases, and accordingly the downsizing can successfully be performed without preventing the highly accurate alignment of the members and lowering the efficiency of interference due to the change in ambient temperature or the like.

(2) In the optical module described in the above-mentioned item (1) above, the optical path of the optical system may include a plurality of light traveling directions.

(3) In the optical module described in the above-mentioned item (1) or (2) above, the optical system may include at least one of an optical component for branching light, an optical component for multiplexing light, an optical component for reflecting light, and an optical component for refracting light.

(4) The optical module described in any one of the above-mentioned items (1) to (3) above may further include an external optical fiber optically connected to the optical interface outside the housing.

(5) In the optical module described in the above-mentioned item (4) above, the optical waveguide maybe an optical fiber having a larger refractive index difference between a core and a cladding than the external optical fiber, and may be bent at a bend radius smaller than a minimum bend radius of the external optical fiber.

(6) The optical module described in the above-mentioned item (4) or (5) above may further include a lens arranged between the housing and the external optical fiber.

(7) The optical module described in any one of the above-mentioned items (1) to (6) above may further include a lens arranged on at least one of the first optical axis and the second optical axis inside the housing.

(8) In the optical module described in the above-mentioned item (6) or (7) above, the lens may be a collimator lens.

(9) The optical module described in any one of the above-mentioned items (1) to (8) above may further include a substrate fixed to an inner side of the housing, and the optical system may be mounted on the substrate.

(10) In the optical module described in the above-mentioned item (9) above, the second connection portion of the optical waveguide may be fixed to the substrate.

(11) In the optical module described in the above-mentioned item (10) above, the first connection portion of the optical waveguide may be arranged without being fixed to the substrate.

(12) In the optical module described in the above-mentioned item (10) above, the first connection portion of the optical waveguide may be fixed to the substrate.

(13) In the optical module described in the above-mentioned item (11) or (12) above, at least one of the first connection portion and the second connection portion of the optical waveguide may include an end surface that is inclined relative to a longitudinal direction of the optical waveguide.

(14) In the optical module described in the above-mentioned item (13) above, a normal passing through the end surface may be parallel to a surface of the substrate.

(15) The optical module described in any one of the above-mentioned items (9) to (14) above may further include a bonding layer interposed between the substrate and the housing, the bonding layer having an elastic coefficient smaller than moduli of elasticity of both of the substrate and the housing.

(16) In the optical module described in any one of the above-mentioned items (1) to (15) above, the housing may include an electric interface for electric connection to the outside, and the optical interface and the electric interface may be arranged opposite to each other across the housing.

DETAILED DESCRIPTION OF THE INVENTION

Hereinbelow, an embodiment of the present invention is described with reference to the accompanying drawings.

Figure 1:
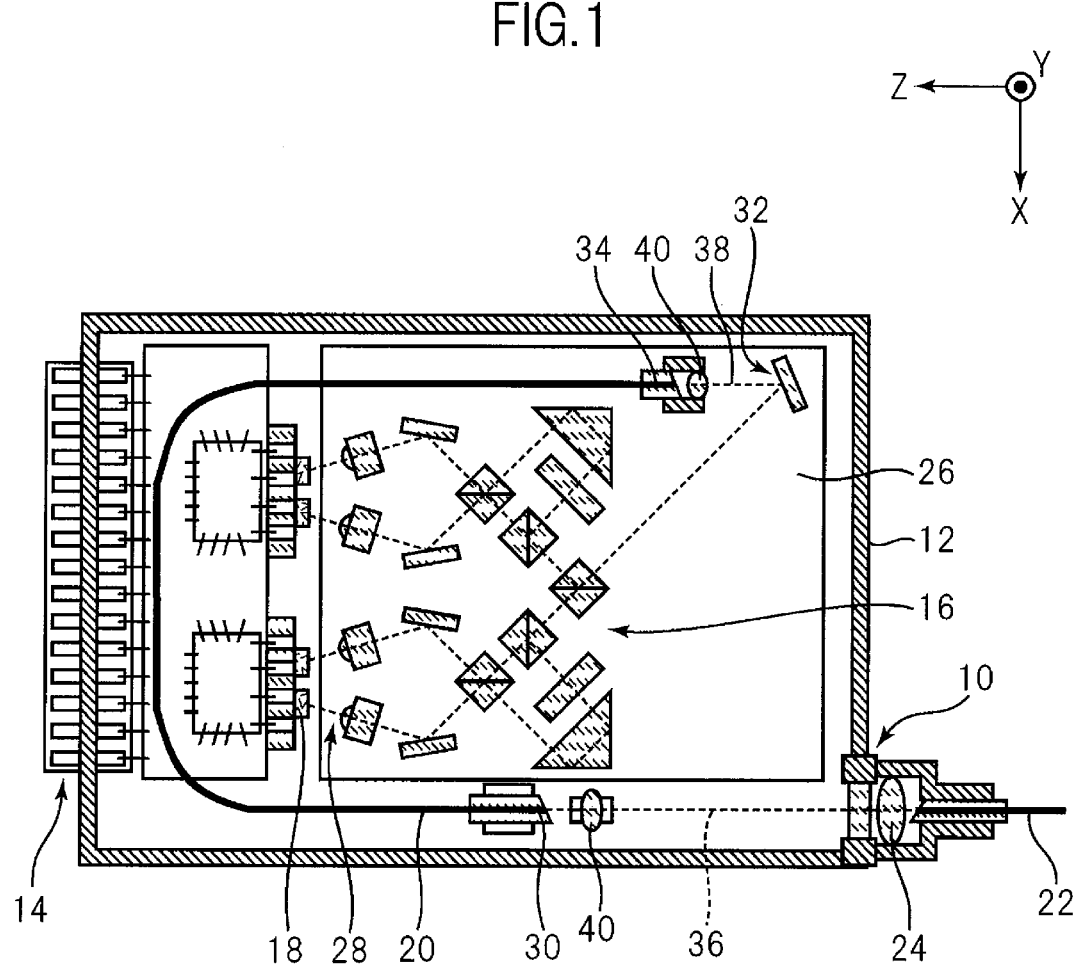
FIG. 1 is a plan view illustrating a structure of an optical module according to an embodiment of the present invention.

FIG. 1 is a view illustrating an optical module according to the embodiment of the present invention. A housing 12 of the optical module includes an optical interface 10 for optical connection to the outside. Outside the housing 12, an external optical fiber 22 is optically connected to the optical interface 10. A lens 24 is arranged between the housing 12 and the external optical fiber 22. The lens 24 is a collimator lens.

The housing 12 also includes an electric interface 14 for electric connection to the outside. The optical module includes an electro-optical device 18 (for example, a light receiving device or a light emitting device). The electro-optical device 18 is electrically connected to the electric interface 14.

An optical system 16, the electro-optical device 18, and an optical waveguide 20 are housed in the housing 12. A substrate 26 is fixed to an inner side of the housing 12. The optical system 16 has an optical path in a space thereof, and is mounted on the substrate 26. The optical path of the optical system 16 has a plurality of light traveling directions. The optical system 16 includes at least one of an optical component for branching light, an optical component for multiplexing light, an optical component for reflecting light, and an optical component for refracting light.

The optical system 16 includes a first input/output port 28 as one of an input port and an output port for an optical signal, and a second input/output port 32 as another one of the input port and the output port for an optical signal. The electro-optical device 18 is optically connected to the first input/output port 28.

The optical module includes the optical waveguide 20 having flexibility. A first connection portion 30 of the optical waveguide 20 is optically connected to the optical interface 10 in the housing 12. A second connection portion 34 of the optical waveguide 20 is optically connected to the second input/output port 32 of the optical system 16.

The second connection portion 34 of the optical waveguide 20 is fixed to the substrate 26. The second connection portion 34 of the optical waveguide 20 has an end surface that is inclined relative to a longitudinal direction of the optical waveguide 20. A normal passing through the end surface is parallel to a surface of the substrate 26. The optical waveguide 20 is an optical fiber having a larger refractive index difference between a core and a cladding than the external optical fiber 22. The optical waveguide 20 is arranged so as to be bent in the housing 12. The optical waveguide 20 is bent at a bend radius smaller than the minimum bend radius of the external optical fiber 22.

A first optical axis 36 passing between the optical interface 10 and the first connection portion 30 is displaced from a second optical axis 38 passing between the second input/output port 32 and the second connection portion 34. A lens 40 is arranged on at least one of the first optical axis 36 and the second optical axis 38. The lens 40 is a collimator lens.

The optical interface 10 and the electric interface 14 are arranged opposite to each other across the housing 12. Thus, when the first input/output port 28 and the second input/output port 32 of the optical system 16 are to be arranged in line, there is a restriction to be imposed on the arrangement of the optical components. In view of this, in this embodiment, the optical waveguide 20 having flexibility is used, and this optical waveguide 20 is bent. Therefore, the shape of the optical waveguide 20 is conformable to the arrangement of the optical system 16, and accordingly there is no need to arrange in line the first input/output port 28 and the second input/output port 32 of the optical system 16. Thus, the degree of freedom in designing the optical system increases, and accordingly downsizing can successfully be performed without preventing highly accurate alignment of the members and lowering efficiency of interference due to a change in ambient temperature or the like.

EXAMPLES

Hereinbelow, description is given of examples that specifically represent the embodiment of the present invention.

Example 1

Figure 2:
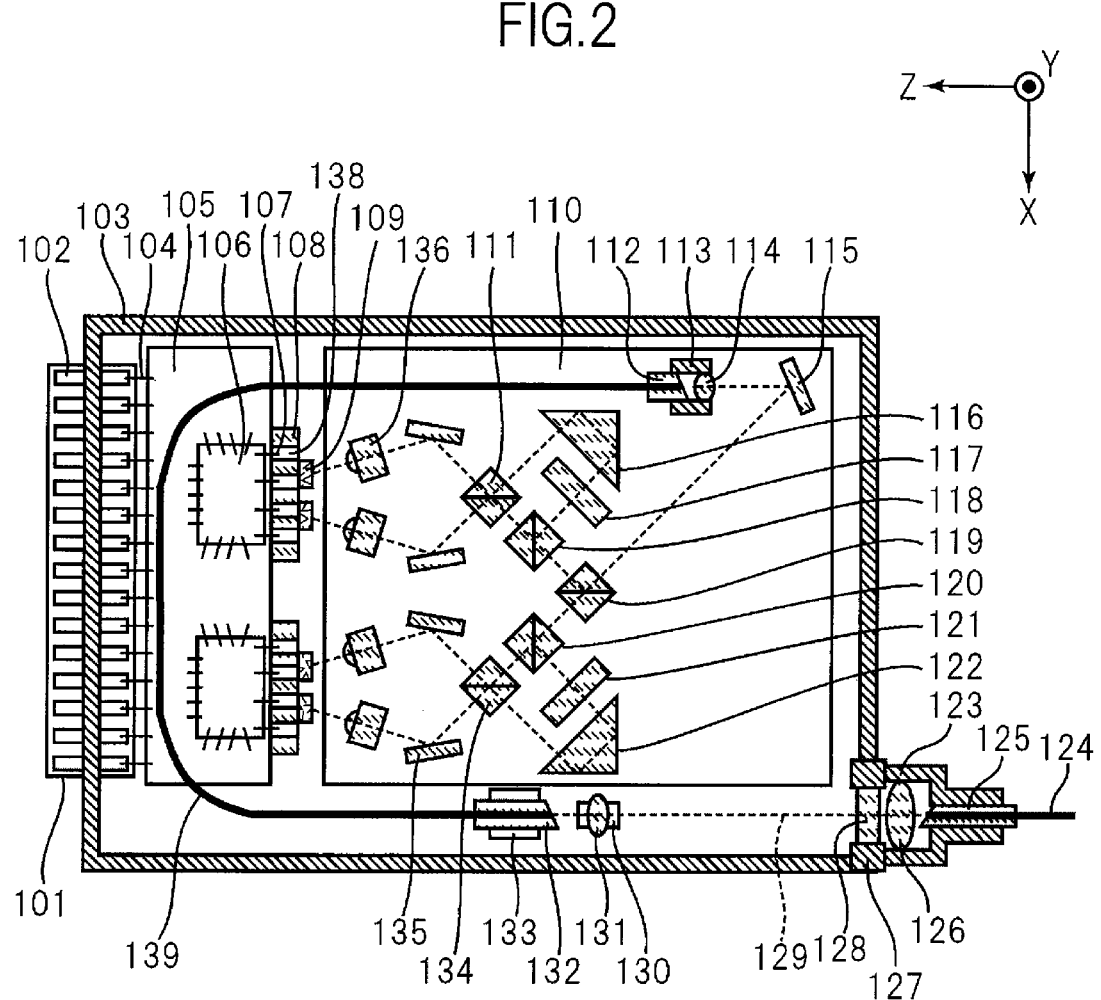
FIG. 2 is a plan view illustrating a structure of an optical module in Example 1 of the present invention.

FIG. 2 is a plan view illustrating a structure of an optical reception module in Example 1 of the present invention. FIG. 2 specifically illustrates a DQPSK optical reception module having a transmission capacity of about 40 Gbps. Further, coordinate axes are illustrated for convenience, and a Z-axis is defined as an input/output direction of an optical signal for the optical reception module.

A housing 103 of a package is made of metal or ceramics. In general, the housing 103 made of metal is less expensive. The housing 103 has a box-like shape, and a lid (not shown) is mounted thereon. By firmly fixing the lid with an inorganic material such as molten metal, members inside the housing 103 are maintained in a hermetically sealed state. Thus, the lid (not shown) is mounted after the members are all mounted and fixed in the housing 103.

The housing 103 is to be provided with a first optical fiber 124 for optical signal input. An end of the first optical fiber 124 is fixed by a ferrule 125, and the ferrule 125 is fixed to a holder 123.

A lens 126 is fixed to the holder 123, and is adjusted so that an optical signal exiting from the end of the first optical fiber 124 is formed into condensed or collimated light by the lens 126. In general, collimated light having a working distance of 10 mm or more is preferred. The holder 123 is firmly fixed using a pipe 127 provided to the housing 103, molten metal, and the like. A light transmissive substrate 128 is provided to the housing 103, and the optical signal passes through the light transmissive substrate 128. In general, the pipe 127, the light transmissive substrate 128, and the housing 103 are each made of an inorganic material such as molten glass or molten metal, and are mutually fixed to one another with no gap so that the members inside the housing 103 are maintained in a hermetically sealed state. The holder 123 may be firmly fixed to the housing 103 before the members are mounted in the housing 103. However, in general, after the lid is firmly fixed to the housing 103, the holder 123 is aligned by an active alignment method (method of aligning the holder 123 while inputting an optical signal to the first optical fiber 124 to observe an electric signal in accordance with light intensity), and then the holder 123 is fixed using molten metal. Note that, the ferrule 125 is made of ceramics such as zirconia, metal, or the like. Further, end surfaces of the ferrule 125 and the first optical fiber 124 are angle-polished. With this structure, the optical signal is prevented from being reflected to return through the original optical path.

In FIG. 2, an optical path 129 of the optical signal is indicated by a broken line. The optical signal passing through the light transmissive substrate 128 is condensed by a lens 131 placed on a base 130, and is input into a second optical fiber 139 fixed by a ferrule 132.

A ferrule 112 is provided to another end of the second optical fiber 139, and the ferrule 112 and a lens 114 are firmly fixed to a holder 113. Light passing through the optical path 129 is formed into collimated light.

The optical path 129 is bent by a mirror 115, and is branched by a half beam splitter 119. The optical components situated in a positive direction of an X-axis and a negative direction of the X-axis across the half beam splitter 119 are substantially line symmetric across the Z-axis, and have substantially the same functions. Therefore, the description is given using the optical components situated in the negative direction of the X-axis relative to the half beam splitter 119. The optical path 129 is branched into two optical paths by a half beam splitter 118. One of the two branched optical paths 129 is turned back by a prism 116 to be led to a half beam splitter 111, and the other of the optical paths 129 is directly led to the half beam splitter 111. The two optical paths 129 have a difference in length of about 15 mm in a DQPSK receiver having a throughput of 40 Gbps. Specifically, the optical path 129 of an optical signal passing through the prism 116 is 15 mm longer, and hence the optical signal is delayed by a period of time corresponding to one bit. For a phase adjustment device 117, there is used, for example, a silicon substrate having polished surfaces through which the optical path 129 is routed. The phase adjustment device 117 has a function of constantly correcting the phase even when a change in wavelength, temperature, or the like occurs. Specifically, a heater is provided to the silicon substrate of the phase adjustment device 117, and a refractive index of silicon is adjusted by means of temperature.

The optical signals passing through the optical paths 129 branched by the half beam splitter 118 are multiplexed and branched by the half beam splitter 111, and the two beams of optical signals interfere with each other. After that, the interfering optical signals are condensed by lenses 136 onto photodiodes 109 mounted on a submount 108, and the optical signals are converted into electric signals. The submount 108 has a principal plane in an XY plane, and the photodiodes 109 are mounted on the principal plane. Wiring patterns 138 are formed on a side surface of the submount 108, and a bias pattern and a signal pattern for the photodiodes 109 are formed. Two photodiodes 109 are mounted on the submount 108, and hence there are formed two bias patterns and two signal patterns, that is, four patterns in total. The wiring patterns 138 are connected for conduction to a pad on an amplifier IC 106 through wires 107. Specifically, electric signals from two photodiodes 109 are input to one amplifier IC 106 because the electric signals output from the two photodiodes 109 have a difference in intensity amplified by the amplifier IC 106, and the resultant signals are output therefrom. Note that, the submount 108 is, in many cases, formed of a ceramic substrate made of alumina, aluminum nitride, or the like.

In many cases, the amplifier integrated circuit (IC) 106 has an automatic gain control (AGC) function to amplify an input signal up to a constant amplitude. The pad on the amplifier IC 106 is connected to transmission line patterns (not shown) on a ceramic substrate 105 through the wires 107. Further, the transmission line patterns on the ceramic substrate 105 are connected to transmission line patterns 102 on a ceramic substrate 101 through wires 104. The ceramic substrate 101 is fixed to the housing 103, and serves to transmit electric signals, electric power, biases, adjustment electric signals, and the like while maintaining the hermetically sealed state inside the housing 103.

In the optical reception module illustrated in FIG. 2, the second optical fiber 139 is mounted in the housing 103. Further, the plurality of mirrors 115 and 135, the half beam splitters 111 and 118 to 120, the prisms 116 and 122, the lenses 136, and other components are mounted on the optical reception module, and the optical signals passing through the optical paths 129 are branched and multiplexed. Hence, it is difficult to arrange the holder 123 holding the first optical fiber 124 and the mirror 115 on the same line (in this case, on the Z-axis), and such arrangement is not preferred from the viewpoint of downsizing the optical module.

In the optical reception module according to this example, the optical signal output from the first optical fiber 124 is guided to the second optical fiber 139 fixed to the ferrule 132 using the lens 126 and the lens 131. Further, the second optical fiber 139 is laid to a predetermined position in the housing 103, and the optical signal is formed into collimated light using the lens 114. After that, the optical signal is input to the interference optical system constructed of the mirror 115, the half beam splitter 119, and other components. Specifically, it is possible to lay the second optical fiber 139 immediately before the interference optical system in the optical reception module, with the result that the housing 103 can be downsized.

Further, by adjusting the length of the second optical fiber 139, the end of the second optical fiber 139 fixed to the ferrule 132 can freely be situated in close proximity to the end of the first optical fiber 124 fixed to the ferrule 125. In the actual optical module, even when the holder 123 is fixed with high accuracy, the housing 103 is distorted due to the change in ambient temperature. However, the end of the first optical fiber 124 can arbitrarily be situated in close proximity to the end of the second optical fiber 139, and hence the optical connection is not easily affected by the change in ambient temperature.

On the other hand, the end of the second optical fiber 139 fixed by the ferrule 112 can be situated in close proximity to the mirror 115. The holder 113 is, in many cases, bonded to a substrate 110 for mounting the optical system with an adhesive or the like, but the adhesive may contract or deform in other such manner due to the ambient temperature. In such a case, the efficiency of interference is deteriorated in proportion to the distance between the end of the second optical fiber 139 and the interference system constructed of the half beam splitter 119 and other components. However, the end of the second optical fiber 139 can be situated in close proximity to the mirror 115, and accordingly the lowering of the efficiency of interference can be prevented.

In general, the specifications of the first optical fiber 124 fixed outside the housing 103 of the optical reception module are defined by the specifications of the optical transceiver having the optical reception module incorporated therein and an optical transmission apparatus having the optical transceiver incorporated therein. For example, in general, the optical fiber used in the transmission apparatus and the like has a minimum bend radius of 30 mm or more from the viewpoint of cost. However, the second optical fiber 139 is provided separately from the first optical fiber 124, and hence the types of those optical fibers can be varied. Specifically, the refractive index difference between the core material and the cladding material of the second optical fiber 139 can be set larger than that of the first optical fiber 124. By increasing the refractive index difference, the bend radius of the optical fiber can be reduced, and accordingly the width and length of the housing 103 of the optical module can be reduced. For example, optical fibers having a minimum bend radius of 5 mm are currently put on sale from optical fiber vendors.

Specifically, this example has an advantage that the housing 103 of the optical reception module can be downsized by incorporating the second optical fiber 139 in the housing 103 of the optical reception module.

In FIG. 2, the optical members such as the mirrors 115 and 135, the prisms 116 and 122, and the half beam splitters 111 and 118 to 120 are mounted on the substrate 110. Those optical members are each made of glass, and hence the substrate 110 is made of a material having a coefficient of thermal expansion close to that of glass. Specifically, a metal such as kovar or 42-ALLOY is used as well as glass and ceramics.

A thin film pattern and the like can be formed on a top surface of glass, ceramics, and the like, and hence the top surface can be marked with alignment marks for mounting the optical members at predetermined positions.

Further, when the mirrors 115 and 135, the prisms 116 and 122, the half beam splitters 111 and 118 to 120, and other components are mounted and fixed to the substrate 110, an adhesive or the like is used, and among others, an ultraviolet curable adhesive is curable without applying heat, which is therefore frequently used. In this case, if the substrate 110 is also made of light transmissive glass, ultraviolet light is applied to part of the back surfaces of the optical members via the glass substrate when the optical members are fixed onto the substrate 110. Thus, there is an advantage that the ultraviolet curable adhesive is curable in a shorter period of time.

The substrate 110 is firmly fixed to a bottom surface of the housing 103 with an adhesive. In this case, the bonding layer after the adhesive is cured has an elastic coefficient smaller than those of materials of the substrate 110 and the housing 103. Description is given of an advantage of this structure.

After the optical components are mounted inside, the lid (not shown) is fixed to the housing 103 by welding. Thus, in a lid bonding step, the temperature of the entire package becomes high, and hence the package deforms due to thermal expansion. Therefore, after the lid is bonded, under room temperature, there remains residual stress in the package formed into a box-like shape by the housing 103 and the lid. When the ambient temperature changes, the housing 103 is distorted due to the residual stress. Further, the ceramic substrate 101 and the light transmissive substrate 128 having different coefficients of thermal expansion are fixed to the housing 103, and hence the housing 103 is likely to deform further due to the change in ambient temperature. In particular, when the bottom surface of the housing 103 partially deforms in a Y-axis direction to have an uneven shape, the substrate 110 mounted on the housing 103 is also likely to deform in the Y-axis direction to have an uneven shape.

In this example, the bonding layer (not shown) is provided between the housing 103 and the substrate 110. The bonding layer has an elastic coefficient smaller than the moduli of elasticity of the housing 103 and the substrate 110. Thus, there is an advantage that, even when the housing 103 deforms, the bonding layer deforms to reduce the deformation of the substrate 110.

Further, the second optical fiber 139 is fixed onto the substrate 110 via the ferrule 112 and the holder 113 as well as the optical members such as the mirrors 115 and 135, the prisms 116 and 122, and the half beam splitters 111, 118 to 120, and 134. Description is given of an advantage of this structure.

An optical signal output side of the second optical fiber 139 is mounted on the substrate 110, and hence an optical axis of the output optical signal is not greatly displaced relative to the optical system mounted on the same substrate 110. Accordingly, there is obtained an advantage that the efficiency of interference of the interference optical system mounted on the substrate 110 is not deteriorated even when the change in ambient temperature occurs.

In FIG. 2, a first connection portion (portion to which the ferrule 132 is provided) of the second optical fiber 139, which is an example of the optical waveguide, is arranged without being fixed to the substrate 110. Specifically, the second optical fiber 139 is mounted on the bottom surface of the housing 103 via the ferrule 132 and a base 133. The base 133 is smaller than the substrate 110, and hence, when the change in ambient temperature occurs, the base 133 follows the deformation of the housing 103. Therefore, there is an advantage that the optical connection of the second optical fiber 139 to the first optical fiber 124 fixed outside the housing 103 is not deteriorated.

Figure 3:
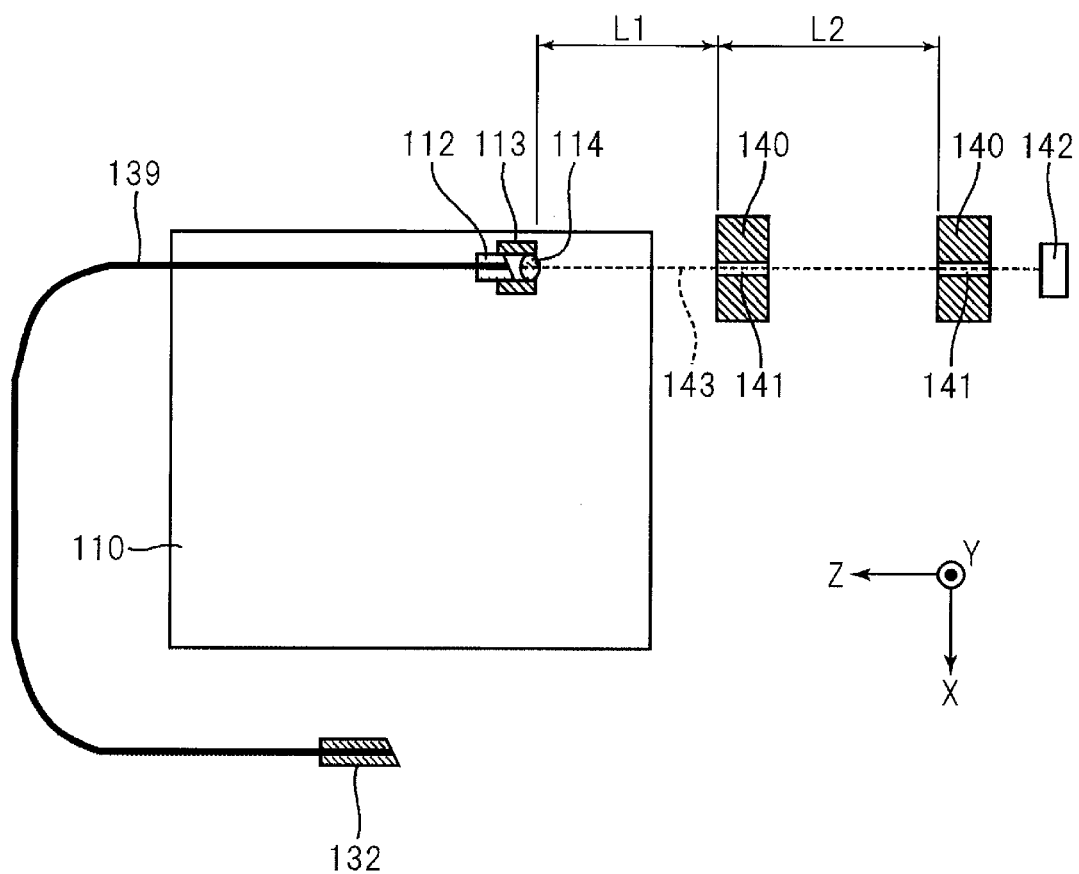
FIG. 3 is a plan view illustrating one step to be performed when assembling an optical reception module in Example 1 of the present invention.
Figure 4:
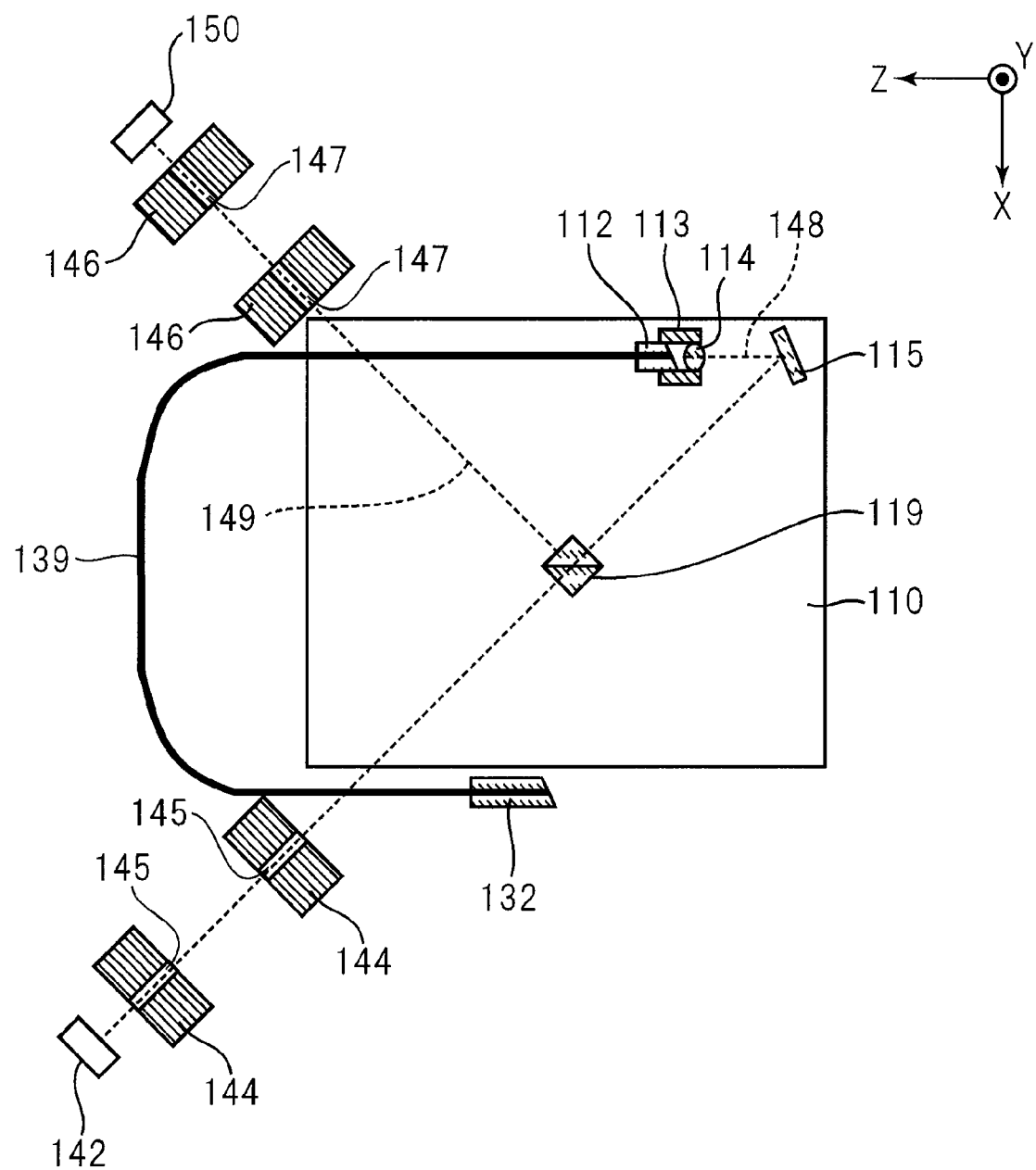
FIG. 4 is a plan view illustrating one step to be performed when assembling the optical reception module in Example 1 of the present invention.

FIGS. 3 and 4 are plan views each illustrating one step to be performed when assembling the optical reception module in Example 1 of the present invention.

FIG. 3 illustrates an adjustment process to be performed when mounting the holder 113, to which the second optical fiber 139, the ferrule 112, and the lens 114 are fixed in advance, on the substrate 110. An adjustment optical signal is input to the second optical fiber 139 fixed to the ferrule 132. At this time, when the shape of the ferrule 132 is 2.5 mmϕ or 1.25 mmϕ, which is adapted to an SC/FC connector, an LC connector, or the like, the adjustment optical signal is easy to input from the outside by only preparing a patch cord and an adapter with a ferrule for an FC, SC, or LC connector. Tip ends of the second optical fiber 139 and the ferrule 132 are subjected to PC polishing or SPC polishing, or alternatively, angle-polished by several degrees from the vertical direction (from the X-axis direction) by APC polishing.

When the holder 113 is fixed, it is preferred that an optical path 143 of the output optical signal be substantially parallel to a principal plane of the substrate 110 (substantially parallel to an XZ plane), that is, have a smaller curve in the Y-axis direction. Therefore, two blocks 140 having the same shape are prepared, and the optical signal is adjusted to pass through two pinholes 141 thereof. The light intensity of the optical signal passing through the pinholes 141 is measured using a monitor 142. It is found that, when the light intensity input to the monitor 142 increases, the optical path 143 of the optical signal output from the end of the holder 113 is substantially parallel to the principal plane of the substrate 110. At this time, by ensuring a small length L1 and a large length L2, the optical path 143 is adjustable in the Y-axis direction with higher accuracy.

In the optical reception module of FIG. 2, the size of one optical component is generally about several millimeters per side. Thus, by the time when the optical signal output from the second optical fiber 139 reaches the photodiodes 109 (see FIG. 2), the optical path is as long as several tens of millimeters. Thus, the length L2 also needs to be about several tens of millimeters. Specifically, it is preferred that the blocks 140 be arranged on an outer side relative to the substrate 110. After the optical path 143 is adjusted, the holder 113 is mounted and fixed to the substrate 110. The holder 113 is fixed using an ultraviolet curable adhesive or the like. The ultraviolet light may be applied from above the substrate 110, or when the substrate 110 is made of light transmissive glass, ceramics, or the like, the ultraviolet light may be applied from the back surface thereof. Accordingly, the ultraviolet curable adhesive situated between the back surface of the holder 113 and the substrate 110 is easy to cure, with the result that there is an advantage that the efficiency of assembling is improved.

FIG. 4 illustrates a step to be performed when assembling the optical reception module in Example 1, specifically, a step to be performed when mounting the mirror 115 and the half beam splitter 119 on the substrate 110. It is assumed that the holder 113 is already mounted and fixed to the substrate 110.

When the mirror 115 is adjusted, blocks 144 provided with pinholes 145 are arranged at two appropriate positions. The orientation of the mirror 115 is adjusted through adjustment along the X-axis and the Z-axis. It is most important to adjust a tilt angle of the mirror 115, that is, to adjust the parallelism of an optical axis on an optical path 148 relative to the XZ plane. This is because, in a case where the parallelism of the optical path 148 relative to the XZ plane is low, it is difficult to perform correction at the half beam splitter 119 that branches the optical path 148. In particular, in the interference optical system, the optical signals branched once need to be multiplexed again, but when the parallelism of the optical path 148 relative to the XZ plane is low, the overlap of the beams of the multiplexed optical signals is deteriorated. The overlap of the beams of the optical signals is proportional to the efficiency of interference. Thus, the tilt angle of the mirror 115 needs to be adjusted at an accuracy of about 0.01°, and it is preferred that the pinholes 145 be also situated outside the substrate 110. After the mirror 115 is adjusted, the mirror 115 is cured with an ultraviolet curable adhesive or the like.

When the half beam splitter 119 is mounted and fixed, the blocks 144 and 146 provided respectively with the pinholes 145 and 147 are arranged at appropriate positions, and the position and orientation of the half beam splitter 119 are adjusted so that the light intensities input to the monitors 142 and 150 are maximized. Needless to say, in order to adjust the position and orientation of the half beam splitter with high accuracy, the pinholes 145 and 147 are preferred to be arranged at remote places, and accordingly the blocks 144 and 146 are arranged on the outer side of the substrate 110. The half beam splitters 118, 111, 120, and 134, the prisms 116 and 122, and other components illustrated in FIG. 2 are adjusted in a similar manner.

As described above, in the step of mounting part of the optical components, it is necessary to perform adjustment by providing the pinholes 145 and 147 and the monitors 142 and 150 outside the substrate 110. Thus, it is preferred that the holder 113 and the optical components such as the mirrors 115 and 135 and the half beam splitters 111, 118 to 120, and 134 be adjusted and fixed outside the housing 103. Thus, the step of preparing the substrate 110 and mounting the components thereon provides an advantage that the optical reception module illustrated in FIG. 2 is easy to produce. In particular, the second optical fiber 139 having flexibility is arranged between the ferrule 112 and the ferrule 132, and hence there is an advantage of lower occurrence of such breakdown that the holder 113 comes off from the substrate 110, even when a ferrule for optical signal input or the like is connected as the ferrule 132. As described above, also from the viewpoint of manufacture, it is found that there is obtained a great advantage from the structure in which the second optical fiber 139 is mounted in the housing 103 separately from the first optical fiber 124.

Example 2

Figure 5:
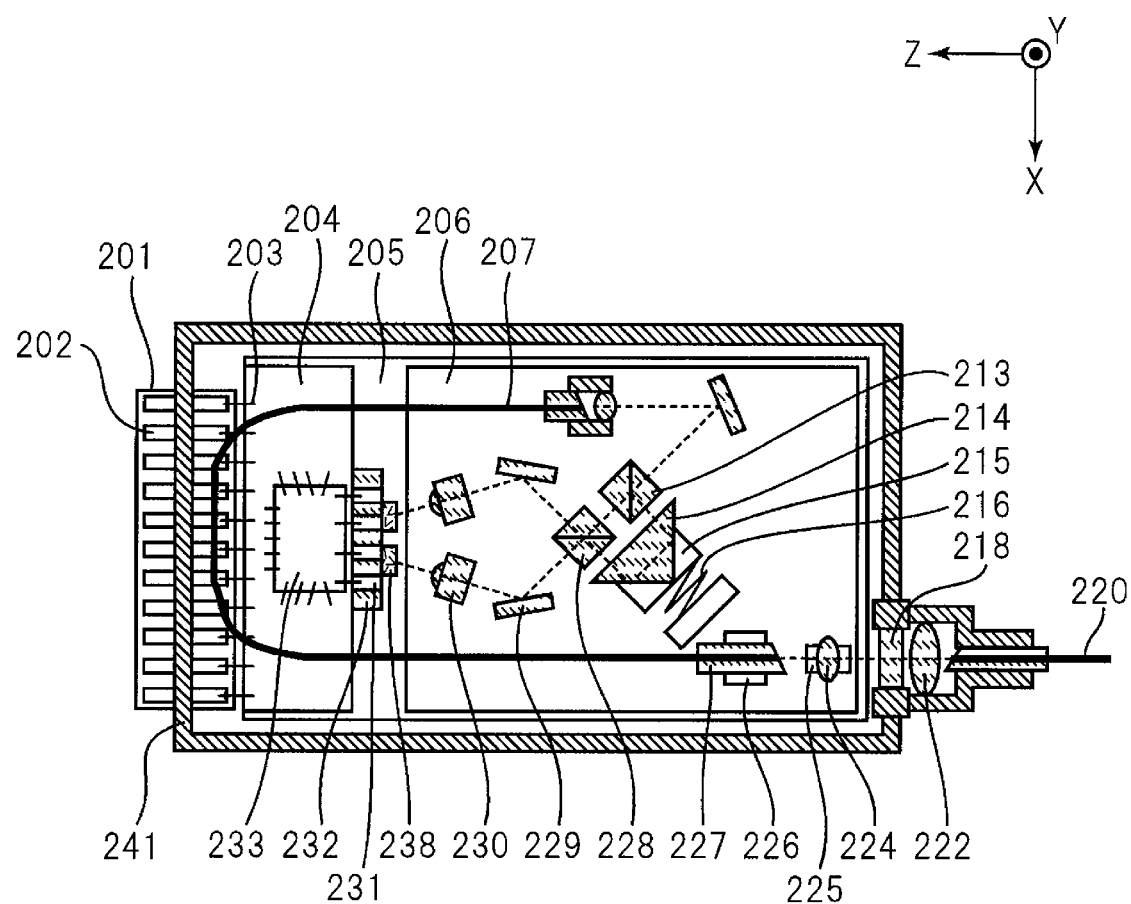
FIG. 5 is a plan view illustrating a structure of an optical module in Example 2 of the present invention.
Figure 6:
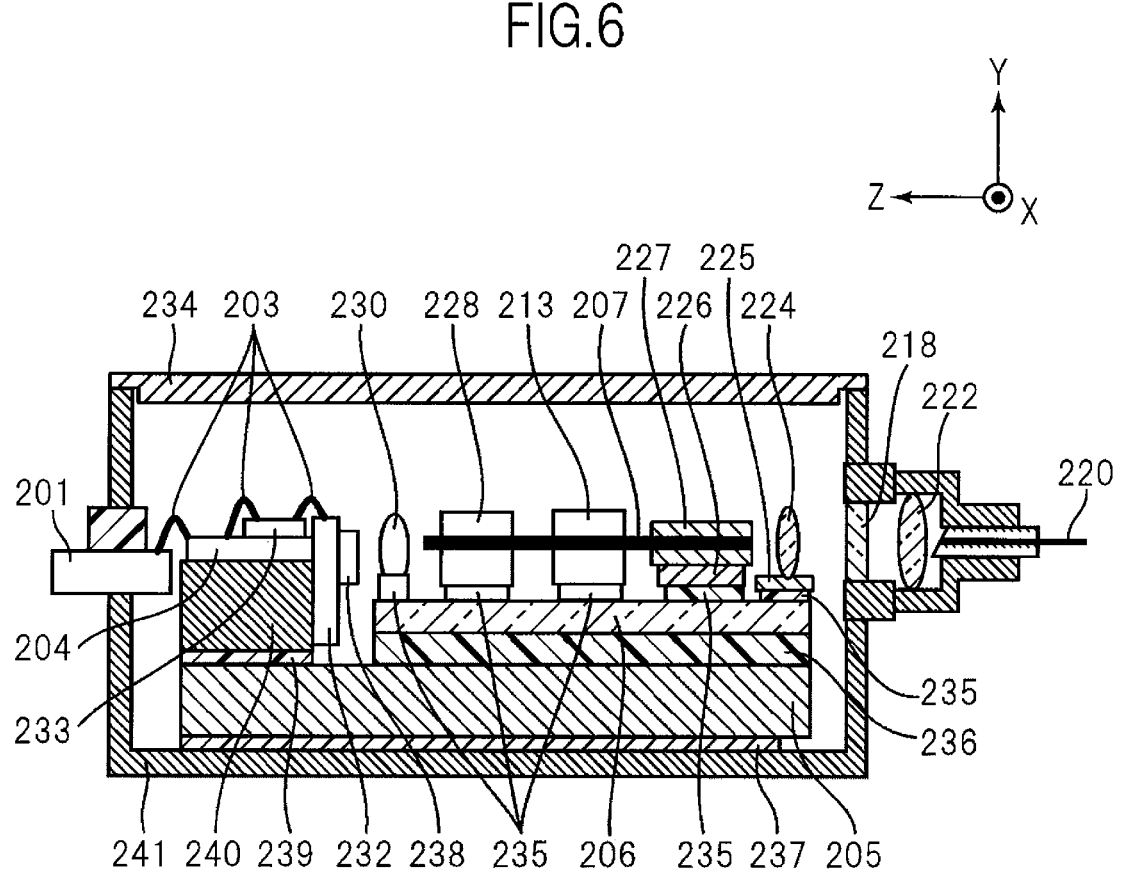
FIG. 6 is a sectional view illustrating the structure of the optical module in Example 2 of the present invention.

FIG. 5 is a plan view illustrating a structure of an optical reception module in Example 2 of the present invention, and illustrates an example of a structure of a DPSK optical reception module. FIG. 6 is a sectional view of the optical reception module illustrated in FIG. 5, which is taken along the YZ plane. Note that, for convenience, FIG. 6 illustrates only part of the optical components illustrated in FIG. 5, and illustrates only part of a second optical fiber 207.

The optical reception module illustrated in FIG. 5 is a DPSK optical reception module, and hence only one pair of interference optical systems are incorporated therein. Specifically, a path that allows the passage of one of two optical signals branched by a half beam splitter 213 is routed through a prism 214, and hence an optical path length of the path is large. The two branched optical signals are multiplexed and interfere with each other by a half beam splitter 228. The prism 214 is firmly fixed onto a base 215. The base 215 is movable by an actuator 216, and therefore the optical path lengths of the two branched optical signals are adjustable. The light beams multiplexed and interfering with each other at the half beam splitter 228 have their orientations of the optical paths changed by mirrors 229, and are then condensed by lenses 230 onto photodiodes 238 mounted on a submount 232.

A plate 205 is mounted on a bottom surface of a housing 241 via solder 237. In this case, the solder 237 is used for fixing between the plate 205 and the housing 241, but an adhesive or the like may be used instead. The plate 205 is made of a material such as metal, glass, and ceramics, but it is preferred that the plate 205 be made of a material having a coefficient of thermal expansion close to those of materials of a substrate 206 and the housing 241. It is preferred that, if possible, the coefficient of thermal expansion of the plate 205 have a mean value of the coefficients of thermal expansion of the two members, or be equal to one of the two coefficients of thermal expansion. Further, the portion on the plate 205 serves as a heat dissipation path for heat generated from an amplifier IC 233. Therefore, it is preferred that the plate 205 be made of metal or ceramics such as alumina or aluminum nitride.

Between the substrate 206 and the housing 241, there is interposed a bonding layer 236 having an elastic coefficient smaller than those of both of the substrate 206 and the housing 241. Specifically, the substrate 206 is mounted on the plate 205 via the bonding layer 236. In general, the ambient temperature at which the optical reception module is used widely ranges approximately from −5° C. to 85° C. Therefore, the housing 241 thermally deforms due to the change in temperature. In particular, an unevenness of about several microns is formed in the bottom surface of the housing 241. Thus, when the bonding layer 236 has an elastic coefficient smaller than those of the plate 205 and the substrate 206, and has a thickness of about several tens of microns, the substrate 206 does not greatly deform even when the change in ambient temperature occurs. Note that, a ferrule 227, the half beam splitters 213 and 228, the lenses 230, and other components are bonded and fixed by bonding layers 235, and the other optical components on the substrate 206 are bonded and fixed by the bonding layers 235 as well. Those bonding layers 235 also thermally deform due to the change in ambient temperature. In this case, the optical components firmly fixed by the bonding layers 235 are also displaced from the predetermined positions. Such displacement of the optical components results in deterioration of the efficiency of interference. In order to prevent such a phenomenon, the thickness of each bonding layer 235 is, in many cases, as small as about 10 microns.

A lens 224 is mounted on the substrate 206 via a base 225, and the ferrule 227 is also mounted on the substrate 206 via a base 226. Specifically, an end portion (first connection portion) of the second optical fiber 207, which is an example of the optical waveguide, is fixed to the substrate 206. Thus, even when an optical axis of a first optical fiber 220 and an optical axis of the second optical fiber 207 are displaced from their appropriate positions due to the change in ambient temperature to cause optical connection loss, the light passing through the optical path routed through a light transmissive substrate 218 is formed into collimated light by a lens 222 and the lens 224. Accordingly, the optical connection loss is not very serious beyond the range of the specifications.

As illustrated in FIG. 6, a base 240 is mounted on the plate 205 via a bonding layer 239. The bonding layer 239 may be made of a material such as solder. A ceramic substrate 204 is mounted on the base 240 via a bonding layer (not shown) or solder (not shown). The amplifier IC 233 is mounted on the ceramic substrate 204. The amplifier IC 233 is a heating element, and therefore a via (not shown) is provided in the ceramic substrate 204 to enhance the heat dissipation property.

Wiring patterns 231 obtained through patterning on an upper side surface of the submount 232, a pad on the amplifier IC 233, a pad on the ceramic substrate 204, and transmission line patterns 202 on a ceramic substrate 201 are connected to one another through wires 203. Further, the photodiodes 238 are fixed for conduction onto a principal plane of the submount 232, and gold, tin, solder, or the like is, in many cases, used for the fixing for conduction.

The ceramic substrate 201 is fixed to a side wall of the housing 241. In order to ensure a hermetically sealed state of the optical components in the housing 241, the ceramic substrate 201 is firmly fixed to the housing 241 using molten metal or the like.

After the members to be mounted in the housing 241 are mounted and fixed to appropriate positions and the steps of wire bonding and the like are performed, a lid 234 is fixed to the housing 241.

Example 3

Figure 7:
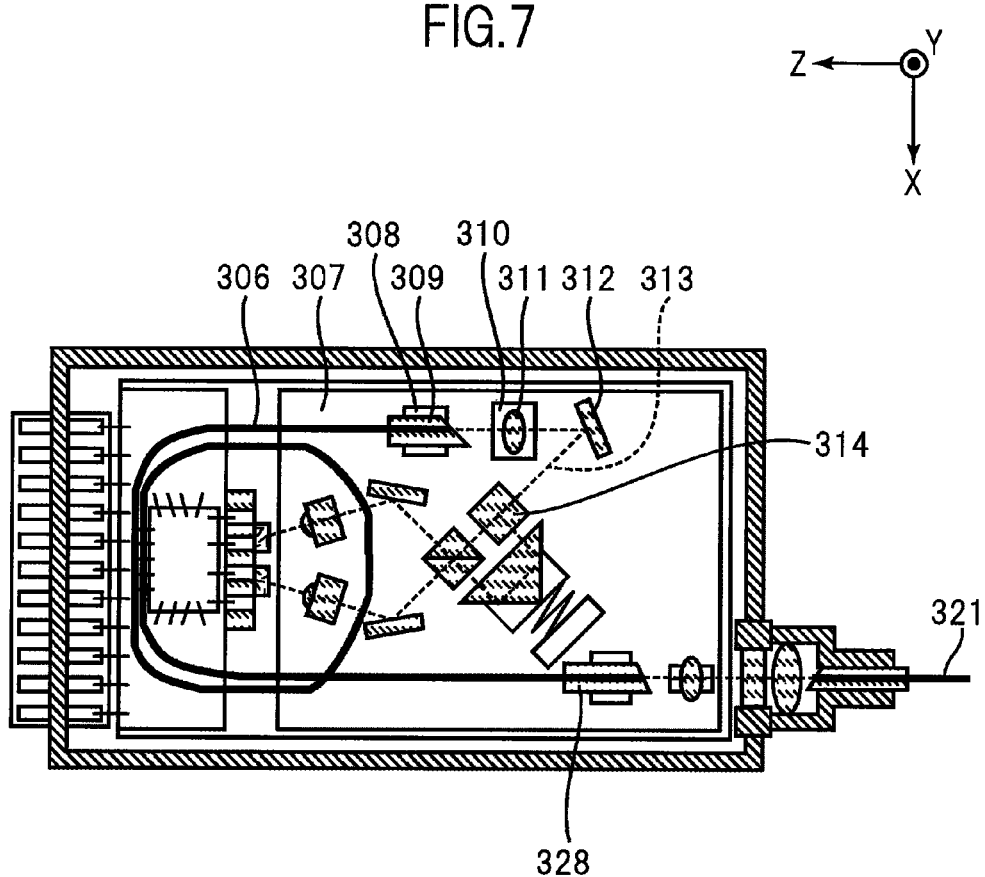
FIG. 7 is a plan view illustrating a structure of an optical module in Example 3 of the present invention.
Figure 8:
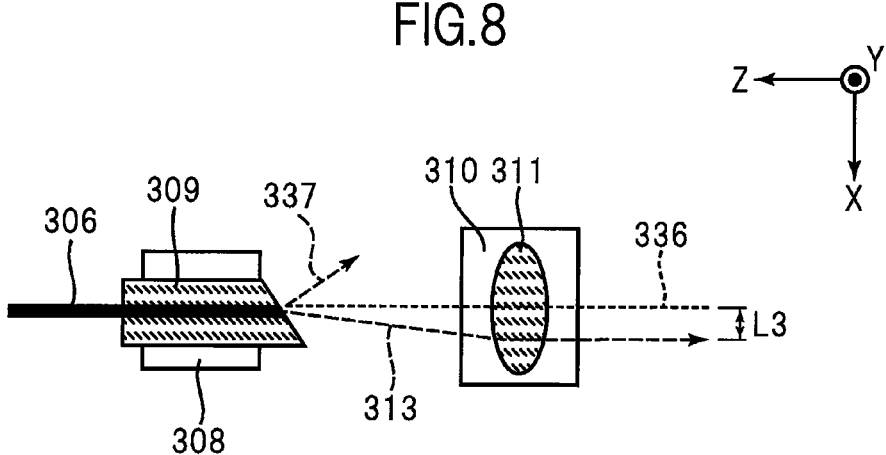
FIG. 8 is a plan view illustrating part of optical components of the optical module in Example 3 of the present invention.

FIG. 7 is a plan view illustrating a structure of an optical reception module in Example 3 of the present invention, and illustrates an example of a structure of a DPSK optical reception module. FIG. 8 illustrates part of optical components of the optical reception module illustrated in FIG. 7.

In a second optical fiber 306, which is an example of the optical waveguide, a first connection portion (portion held by a ferrule 328) optically connected to an optical interface for optical connection to the outside is also fixed to a substrate 307. The first connection portion and a second connection portion (portion held by a ferrule 309) of the second optical fiber 306 each have an end surface that is inclined relative to a longitudinal direction of the second optical fiber 306. A normal passing through the end surface is parallel to a surface of the substrate 307.

One end portion of the second optical fiber 306 and the ferrule 328 to which the end portion is fixed have angle-polished light input ends. This structure is provided so as to prevent the optical signal reflected at the end of the second optical fiber 306 from returning into a first optical fiber 321. The other end portion of the second optical fiber 306 and the ferrule 309 to which the other end portion is fixed also have angle-polished light exiting ends. This structure is provided so as to prevent, for example, the optical signal reflected by a lens 311 from returning to the second optical fiber 306. Those end portions of the second optical fiber 306 exert their functions as long as the end portions are angle-polished by one degree or more from the vertical direction relative to the second optical fiber 306. The ferrule 309 and the lens 311 are mounted on separate bases 308 and 310, and are mounted on the substrate 307, separately. The position and shape of the lens 311 are designed to form the light output from the second optical fiber 306 through an optical path 313 into collimated light.

As illustrated in FIG. 8, the end portion of the second optical fiber 306 and the ferrule 309 to which the end portion is fixed are angle-polished, and a normal 337 to their polished surfaces is substantially parallel to the XZ plane. In this case, the fiber 306 fixed to the ferrule 309 is angle-polished, and hence the optical path 313 of the optical signal exiting from the optical fiber 306 is displaced in the X-axis direction relative to a center axis 336. The optical signal is formed into collimated light by the lens 311, and at this time, the collimated light translates by a length L3 in the X-axis direction from the center axis 336.

However, the optical path 313, which is displaced from the defined position in parallel to the substrate 307 as described above, can be corrected by adjusting the positions and orientations of a mirror 312 and a half beam splitter 314.

If the normal 337 to the polished surfaces has a Y component, the optical path 313, which allows the passage of the collimated light obtained through the lens 311, has a height in the Y-axis direction changed relative to the substrate 307. When the height of the optical path in the Y-axis direction is changed, it is difficult to perform the correction using the mirror 312 and the half beam splitter 314.

Thus, in the case where the end portion of the second optical fiber 306 and the ferrule 309 to which the end portion is fixed are angle-polished as illustrated in FIGS. 7 and 8, there is obtained an advantage when the ferrule 309 is mounted so that the normal 337 to the polished surfaces is substantially parallel to the XZ plane.

The same applies to the case of the angle-polished ferrule 328.

Example 4

Figure 9:
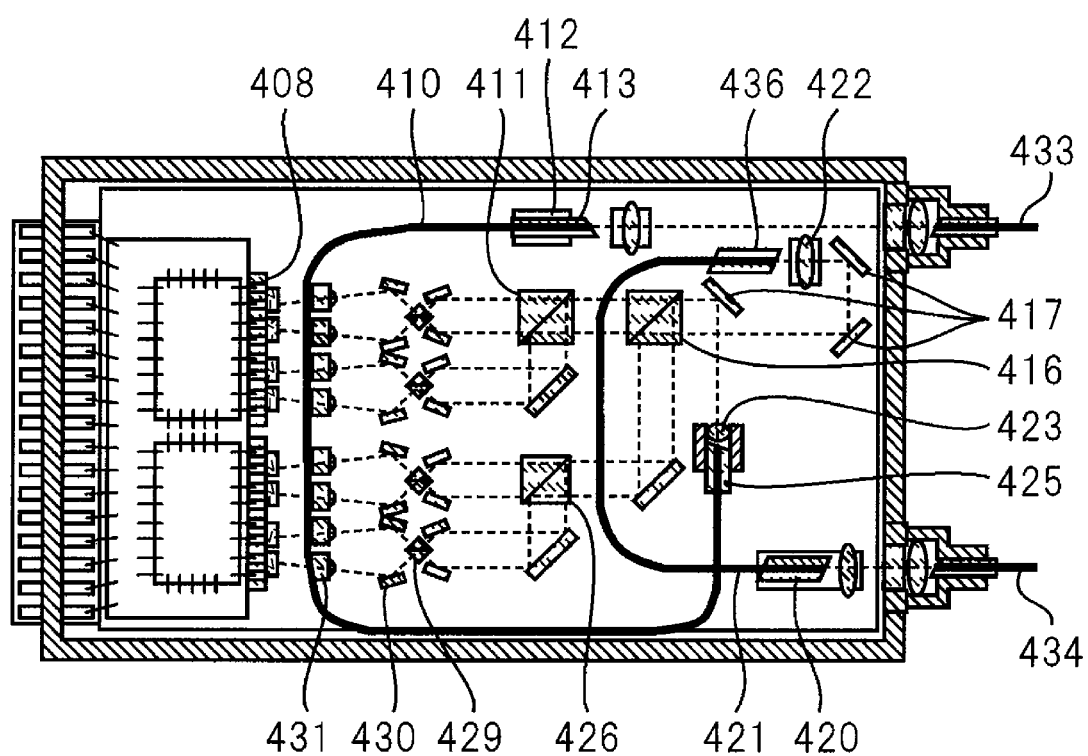
FIG. 9 is a plan view illustrating a structure of an optical module in Example 4 of the present invention.

FIG. 9 is a plan view illustrating a structure of an optical reception module in Example 4 of the present invention, and illustrates an example of a structure of a DP-QPSK optical reception module.

In this example, a first optical fiber 433 is arranged for optical signal input, and a third fiber 434 is arranged for reference light input. In the DP-QPSK optical reception module, the reference light and the optical signal are caused to interfere with each other to read data.

The optical signal passing through the first optical fiber 433 and a second optical fiber 410 is formed into collimated light by a lens 423. The orientation of the optical path of the collimated light is changed by a mirror 417, and is then input to a polarization beam splitter 416.

On the other hand, the reference light passes through the third fiber 434, and then passes through a fourth optical fiber 421 held by a ferrule 420. Then, the reference light is collimated by a lens 422, and the orientation of the optical path is changed by mirrors 417. After that, the reference light is input to the polarization beam splitter 416.

In this example, it is necessary to input the signal light and the reference light through the same surface of the polarization beam splitter 416. In general, the size of the polarization beam splitter 416 is as small as several millimeters per side from the viewpoint of cost, and therefore the polarization beam splitter 416 cannot be arranged simultaneously on the optical axes of the first optical fiber 433 and the third fiber 434.

Thus, in order to input the signal light and the reference light through the same surface of the polarization beam splitter 416, though the ends of the second optical fiber 410 and the fourth optical fiber 421 are fixed to ferrules 413 and 420, respectively, the intermediate parts are fiber lines that are rich in flexibility, and hence a ferrule 425, a ferrule 436, the lenses 422 and 423, and the mirrors 417 can be fixed at arbitrary positions. The second optical fiber 410 and the fourth optical fiber 421 to be used each have a diameter of approximately from 125 μm to 1 mm, and may partially be covered with an organic substance.

The light passing through the polarization beam splitter 416 and the light reflected by the polarization beam splitter 416 are respectively divided into horizontally polarized light and vertically polarized light. Those beams of the signal light and the reference light are branched by half beam splitters 411 and 426, respectively, and then interfere with each other at half beam splitters 429. The interfering light beams pass through mirrors 430 and lenses 431, and are subjected to opto-electric conversion by photodiodes 408.

Example 5

Figure 10:
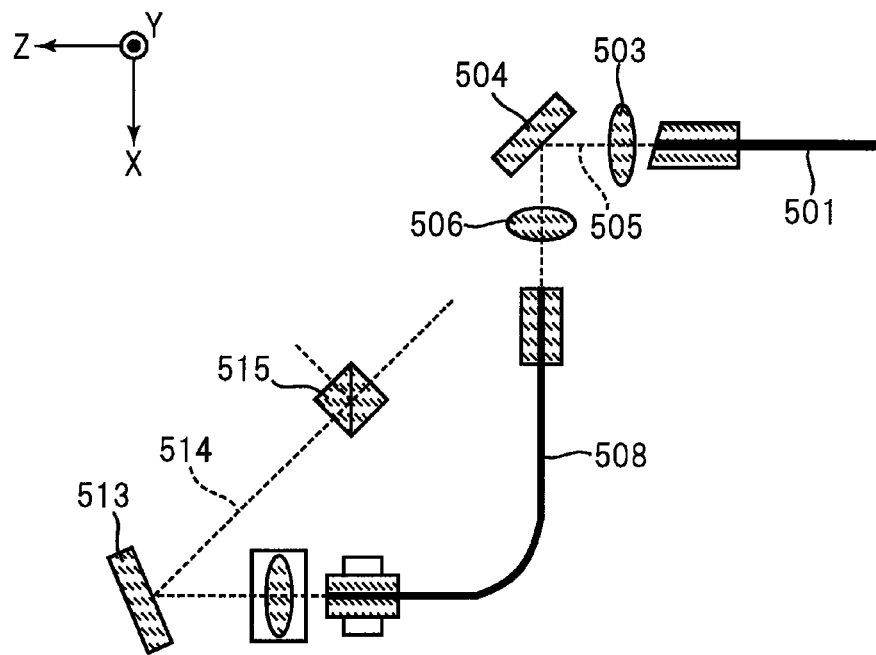
FIG. 10 is a plan view illustrating a partial structure of an optical module in Example 5 of the present invention.

FIG. 10 is a plan view illustrating a partial structure of an optical reception module in Example 5 of the present invention. The optical transmission and reception module is an optical reception module using phase modulation. FIG. 10 illustrates arrangement of optical components within a range including a first optical fiber 501, a second optical fiber 508, and a half beam splitter 515. For simplification of the drawing, components such as a housing, a substrate, and a holder are omitted.

The first optical fiber 501 and a lens 503 are fixed on an outer side of the housing (not shown), and the lens 503 is a collimator lens. An optical path 505 is bent by a mirror 504, and the light is condensed by a lens 506. Then, the optical signal is input to the second optical fiber 508. As described above, the optical component (mirror 504) for converting the optical path may be arranged between the first optical fiber 501 and the second optical fiber 508. The orientation of an optical path 514, which allows the passage of the light output from the second optical fiber 508, is changed by a mirror 513, and the optical path 514 is then branched by the half beam splitter 515. The optical paths and the optical components after the branching are not illustrated.

As described above, by arranging the second optical fiber 508 irrespective of the fixing position of the first optical fiber 501, the optical components in the housing can be freely arranged, and the length of the optical path routed in the space can be reduced. Thus, the optical axis is not easily displaced even when the change in temperature occurs, which enhances the efficiency of interference.

Example 6

Figure 11:
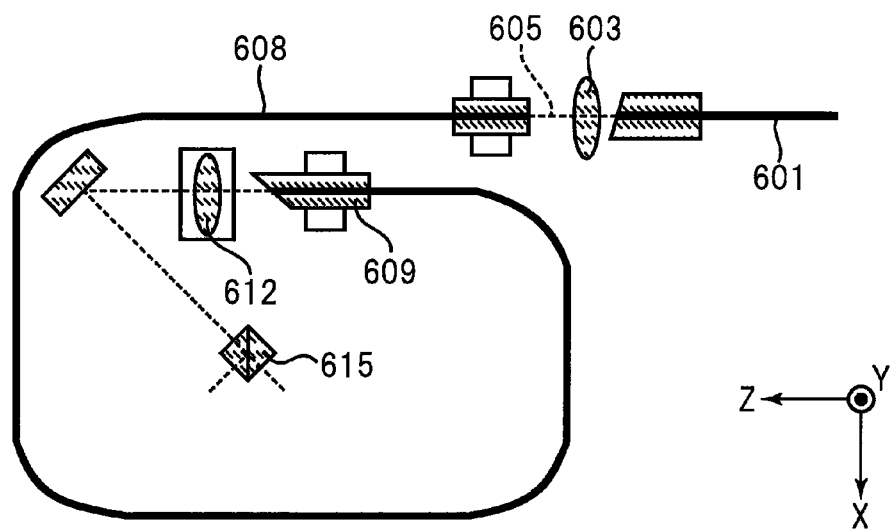
FIG. 11 is a plan view illustrating a partial structure of an optical module in Example 6 of the present invention.

FIG. 11 is a plan view illustrating a partial structure of an optical reception module in Example 6 of the present invention. The optical transmission and reception module is an optical reception module using phase modulation. FIG. 11 illustrates arrangement of optical components within a range including a first optical fiber 601, a second optical fiber 608, and a half beam splitter 615. For simplification of the drawing, components such as a housing, a substrate, and a holder are omitted.

The light output from the first optical fiber 601 along an optical axis 605 is condensed by a lens 603, and the optical signal is input to the second optical fiber 608. In this example, the mounting position of the lens 603 may be inside or outside the housing. The second optical fiber 608 is looped, and the optical signal is output from a tip end of the second optical fiber 608 that is angle-polished together with a ferrule 609. The optical signal is formed into collimated light by a lens 612. In the second optical fiber 608, a fiber that is rich in flexibility extends in the center portion, and hence the heights of the output end of the first optical fiber 601 and the output end of the second optical fiber 608 in the Y-axis direction can be converted.

The present invention is not limited to the embodiment described above, and various modifications may be made thereto. Further, the structure described above in the embodiment may be replaced by substantially the same structure, a structure providing the same action and effect, and a structure which may achieve the same object.

What is claimed is:

1. An optical module, comprising:
   an optical system having an optical path in a space thereof;
   an electro-optical device optically connected to a first input/output port as one of an input port and an output port of the optical system;
   an optical waveguide having flexibility;
   a housing comprising an optical interface for optical connection to an outside, for housing the optical system, the electro-optical device, and the optical waveguide;
   a substrate mounted on and fixed to an inner side of the housing; and
   an external optical fiber optically connected to the optical interface outside the housing,
   wherein the optical waveguide comprises:
      a first connection portion optically connected to the optical interface in the housing; and
      a second connection portion optically connected to a second input/output port as another one of the input port and the output port of the optical system,
   wherein the optical waveguide is bent in the housing,
   wherein a first optical axis passing between the optical interface and the first connection portion is displaced from a second optical axis passing between the second input/output port and the second connection portion,
   wherein the optical system is mounted on the substrate,
   wherein the second connection portion of the optical waveguide is mounted on and fixed to the substrate, and
   wherein the optical waveguide comprises an optical fiber having a larger refractive index difference between a core and a cladding than the external optical fiber, and is bent at a bend radius smaller than a minimum bend radius of the external optical fiber.

2. The optical module according to claim 1, wherein the optical path of the optical system comprises a plurality of light traveling directions.

3. The optical module according to claim 1, wherein the optical system comprises at least one of an optical component for branching light, an optical component for multiplexing light, an optical component for reflecting light, and an optical component for refracting light.

4. The optical module according to claim 1, further comprising:
   a lens arranged between the housing and the external optical fiber.

5. The optical module according to claim 1, further comprising:
   a lens arranged on at least one of the first optical axis and the second optical axis inside the housing.

6. The optical module according to claim 4, wherein the lens comprises a collimator lens.

7. The optical module according to claim 1, wherein the first connection portion of the optical waveguide is not fixed to the substrate.

8. The optical module according to claim 1, wherein the first connection portion of the optical waveguide is fixed to the substrate.

9. The optical module according to claim 7, wherein at least one of the first connection portion and the second connection portion of the optical waveguide comprises an end surface that is inclined relative to a longitudinal direction of the optical waveguide.

10. The optical module according to claim 9, wherein a normal passing through the end surface is parallel to a surface of the substrate.

11. The optical module according to claim 1, further comprising:
a bonding layer interposed between the substrate and the housing, the bonding layer having an elastic coefficient smaller than moduli of elasticity of both of the substrate and the housing.

12. The optical module according to claim 1,
wherein the housing further comprises an electric interface for electric connection to the outside, and
wherein the optical interface and the electric interface are arranged opposite to each other across the housing.

13. An optical module, comprising:
an optical system having an optical path in a space thereof;
an electro-optical device optically connected to a first input/output port as one of an input port and an output port of the optical system;
an optical waveguide having flexibility;
a housing comprising an optical interface for optical connection to an outside, for housing the optical system, the electro-optical device, and the optical waveguide; and
an external optical fiber optically connected to the optical interface outside the housing,
wherein the optical waveguide comprises:
a first connection portion optically connected to the optical interface in the housing; and
a second connection portion optically connected to a second input/output port as another one of the input port and the output port of the optical system,
wherein the optical waveguide is bent in the housing, and
wherein a first optical axis passing between the optical interface and the first connection port is displaced from a second optical axis passing between the second input/output port and the second connection portion,
wherein the optical waveguide comprises an optical fiber having a larger refractive index difference between a core and a cladding than the external optical fiber, and is bent at a bend radius smaller than a minimum bend radius of the external optical fiber.

14. An optical module, comprising:
an optical system having an optical path in a space thereof;
an electro-optical device optically connected to a first input/output port as one of an input port and an output port of the optical system;
an optical waveguide having flexibility;
a housing comprising an optical interface for optical connection to an outside, for housing the optical system, the electro-optical device, and the optical waveguide;
a substrate fixed to an inner side of the housing; and
a bonding layer interposed between the substrate and the housing, the bonding layer having an elastic coefficient smaller than moduli of elasticity of both of the substrate and the housing;
wherein the optical waveguide comprises:
a first connection portion optically connected to the optical interface in the housing; and
a second connection portion optically connected to a second input/output port as another one of the input port and the output port of the optical system,
wherein the optical waveguide is bent in the housing, and
wherein a first optical axis passing between the optical interface and the first connection portion is displaced from a second optical axis passing between the second input/output port and the second connection portion,
wherein the optical system is mounted on the substrate.

15. An optical module, comprising:
an optical system having an optical path in a space thereof;
an electro-optical device optically connected to a first input/output port as one of an input port and an output port of the optical system;
an optical waveguide having flexibility;
a housing comprising an optical interface for optical connection to an outside, for housing the optical system, the electro-optical device, and the optical waveguide;
a substrate mounted on and fixed to an inner side of the housing; and
a bonding layer interposed between the substrate and the housing, the bonding layer having an elastic coefficient smaller than moduli of elasticity of both of the substrate and the housing,
wherein the optical waveguide comprises:
a first connection portion optically connected to the optical interface in the housing; and
a second connection portion optically connected to a second input/output port as another one of the input port and the output port of the optical system,
wherein the optical waveguide is bent in the housing,
wherein a first optical axis passing between the optical interface and the first connection portion is displaced from a second optical axis passing between the second input/output port and the second connection portion,
wherein the optical system is mounted on the substrate, and
wherein the second connection portion of the optical waveguide is mounted on and fixed to the substrate.

* * * * *